US010984164B1

(12) United States Patent
Chaplot et al.

(10) Patent No.: US 10,984,164 B1
(45) Date of Patent: Apr. 20, 2021

(54) METHOD, SYSTEM, AND PRODUCT FOR GENERATING AND MAINTAINING A PHYSICAL DESIGN FOR AN ELECTRONIC CIRCUIT HAVING SYNC GROUP CONSTRAINTS FOR DESIGN RULE CHECKING

(71) Applicant: Cadence Design Systems, Inc., San Jose, CA (US)

(72) Inventors: Ankur Chaplot, Noida (IN); Yashu Gupta, Greater Noida (IN); Nikhil Garg, Faridabad (IN); Sachin Shrivastava, Noida (IN); Michaela Guiney, San Jose, CA (US); Sankalp Srivastava, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/661,974

(22) Filed: Oct. 23, 2019

(51) Int. Cl.
*G06F 30/392* (2020.01)
*G06F 30/327* (2020.01)
*G06F 30/398* (2020.01)
*G06F 111/04* (2020.01)

(52) U.S. Cl.
CPC .......... *G06F 30/392* (2020.01); *G06F 30/327* (2020.01); *G06F 30/398* (2020.01); *G06F 2111/04* (2020.01)

(58) Field of Classification Search
CPC .... G06F 30/392; G06F 30/398; G06F 30/327; G06F 2111/04
See application file for complete search history.

(56) References Cited

U.S. PATENT DOCUMENTS

| | | | |
|---|---|---|---|
| 8,086,978 B2 | 12/2011 | Zhang | |
| 8,086,983 B2 | 12/2011 | Shrivastava | |
| 8,336,010 B1 | 12/2012 | Chang | |
| 8,612,199 B2 | 12/2013 | Shrivastava et al. | |
| 8,762,908 B1 | 6/2014 | Chang et al. | |
| 8,813,006 B1 | 8/2014 | Parameswaran | |
| 8,943,454 B1* | 1/2015 | Hsiao | G06F 30/398 716/113 |
| 9,495,492 B1* | 11/2016 | Ramabadran | G06F 30/3312 |
| 9,904,756 B1* | 2/2018 | Ruehl | G06F 30/398 |
| 10,192,021 B1 | 1/2019 | Raj et al. | |
| 10,250,052 B2* | 4/2019 | Patil | H02J 7/0071 |
| 10,296,703 B1 | 5/2019 | Juneja et al. | |
| 10,452,807 B1 | 10/2019 | Sharma et al. | |
| 10,534,887 B1 | 1/2020 | Nair et al. | |

(Continued)

*Primary Examiner* — Stacy Whitmore
(74) *Attorney, Agent, or Firm* — Vista IP Law Group, LLP

(57) ABSTRACT

An approach is described for a method, system, and product, the approaching includes identification of an integrated circuit design, identification of sync groups (nets having synchronous voltage levels), generation of a physical design having sync group constraints, and performance of design rule checking on a physical design based on at least transferred sync group information. This provides for performing design rule analysis at least using small minimum spacing requirements then would otherwise be required with prior techniques. In some embodiments, the approach includes a verification process that ensures that synchronous voltage behavior is appropriately associated with members of respective sync groups and cleans up old association data that is no longer relevant/correct.

20 Claims, 13 Drawing Sheets

(56) References Cited

U.S. PATENT DOCUMENTS

| | | | |
|---|---|---|---|
| 2005/0198601 A1* | 9/2005 | Kuang | G06F 30/33 |
| | | | 716/108 |
| 2006/0101357 A1* | 5/2006 | Allen | G06F 30/394 |
| | | | 716/52 |
| 2007/0106968 A1* | 5/2007 | Culp | G06F 30/39 |
| | | | 716/53 |
| 2009/0289604 A1* | 11/2009 | Carkner | H02J 7/0071 |
| | | | 320/151 |
| 2011/0115440 A1* | 5/2011 | Sabi | H01M 10/44 |
| | | | 320/145 |
| 2011/0175576 A1* | 7/2011 | Uesaka | H02J 7/0044 |
| | | | 320/155 |
| 2012/0126744 A1* | 5/2012 | Kuroda | H02J 7/0071 |
| | | | 320/107 |
| 2013/0069425 A1* | 3/2013 | Kanazawa | B60L 50/16 |
| | | | 307/9.1 |
| 2013/0074024 A1* | 3/2013 | Chase | G06F 30/398 |
| | | | 716/112 |
| 2014/0217968 A1* | 8/2014 | Takahashi | H02J 50/10 |
| | | | 320/108 |
| 2015/0236522 A1* | 8/2015 | Zhao | H02J 7/00036 |
| | | | 320/162 |
| 2017/0256973 A1* | 9/2017 | Kim | H02J 7/0068 |
| 2018/0052951 A1* | 2/2018 | Hofmann | G06F 30/398 |
| 2019/0089175 A1* | 3/2019 | Zhang | H02J 7/0034 |

* cited by examiner

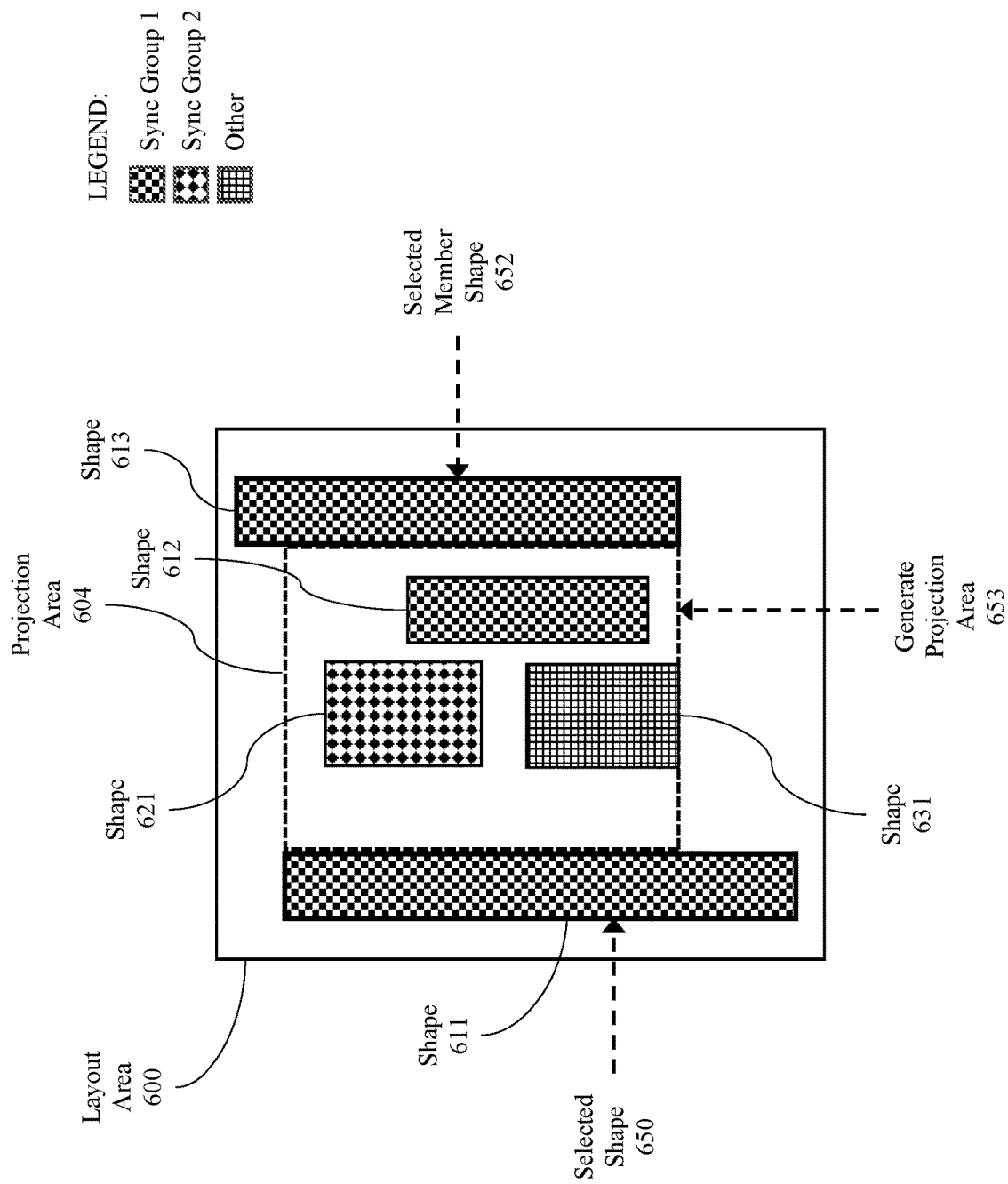

METHOD, SYSTEM, AND PRODUCT FOR GENERATING AND MAINTAINING A PHYSICAL DESIGN FOR AN ELECTRONIC CIRCUIT HAVING SYNC GROUP CONSTRAINTS FOR DESIGN RULE CHECKING

BACKGROUND

Semiconductor devices are used in a variety of electronic applications, such as personal computers, cell phones, digital cameras, and other electronic equipment. Semiconductor devices are typically fabricated by sequentially depositing insulating or dielectric layers, conductive layers, and semiconductive layers of material over a semiconductor substrate, and patterning the various material layers using lithography to form circuit components and elements thereon.

Despite the continued increases in the density and performance of integrated circuits, consumers and the engineers/designers that provide them products continue to demand more from semiconductors devices. One way to improve the functioning of an integrated circuit is to increase the amount of processing elements/circuits that are provided within a given integrated circuit without otherwise causing other problems. Since integrated circuit design is heavily dependent on the tools used to design them, an improvement in the processes of an electronic design automation (EDA) system could yield semiconductor devices that provide improved performance.

These EDA tools are often used for performing layout (arrangement of shapes to be manufactured) and verification and/or correction of rule violations on an integrated circuit design. For instance, some layout processes enforce spacing rules used to avoid manufacturing devices that have unintended behavior in order to create a correct by construction layout—e.g. to avoid shorts, electromagnetic interference, compliance with manufacturing tolerances, and manufacturability of shapes. In particular, one area where current design rule check processes could be improved is in analysis of shapes that have a synchronous voltage behavior which is not currently accounted for in verification processes.

Therefore, what is needed is an improved approach for generating and maintaining a physical design for an electronic circuit that accounts for synchronous voltage behavior.

SUMMARY

Embodiments of the present invention provide a method, system, and product for generating and maintaining a physical design for an electronic circuit having sync group constraints for design rule checking.

According to some embodiments, the approaching includes identification of an integrated circuit design, identification of sync groups (nets having synchronous voltage levels), generation of a physical design having sync group constraints, and performance of design rule checking on a physical design based on at least transferred sync group information. This provides for performing design rule analysis at least using smaller minimum spacing requirements then would otherwise be required with prior techniques. In some embodiments, the approach includes a verification process that ensures that synchronous voltage behavior is appropriately associated with members of respective sync groups and cleans up old association data that is no longer relevant/correct.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

FIGS. 6A-6F provide an illustrative example of the more detailed flow for the execution of a marker shape generation process in FIG. 4 according to some embodiments.

DETAILED DESCRIPTION

Embodiments of the present invention provide a method, system, and product for generating and maintaining a physical design for an electronic circuit having sync group constraints for design rule checking.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated.

Figure 1:
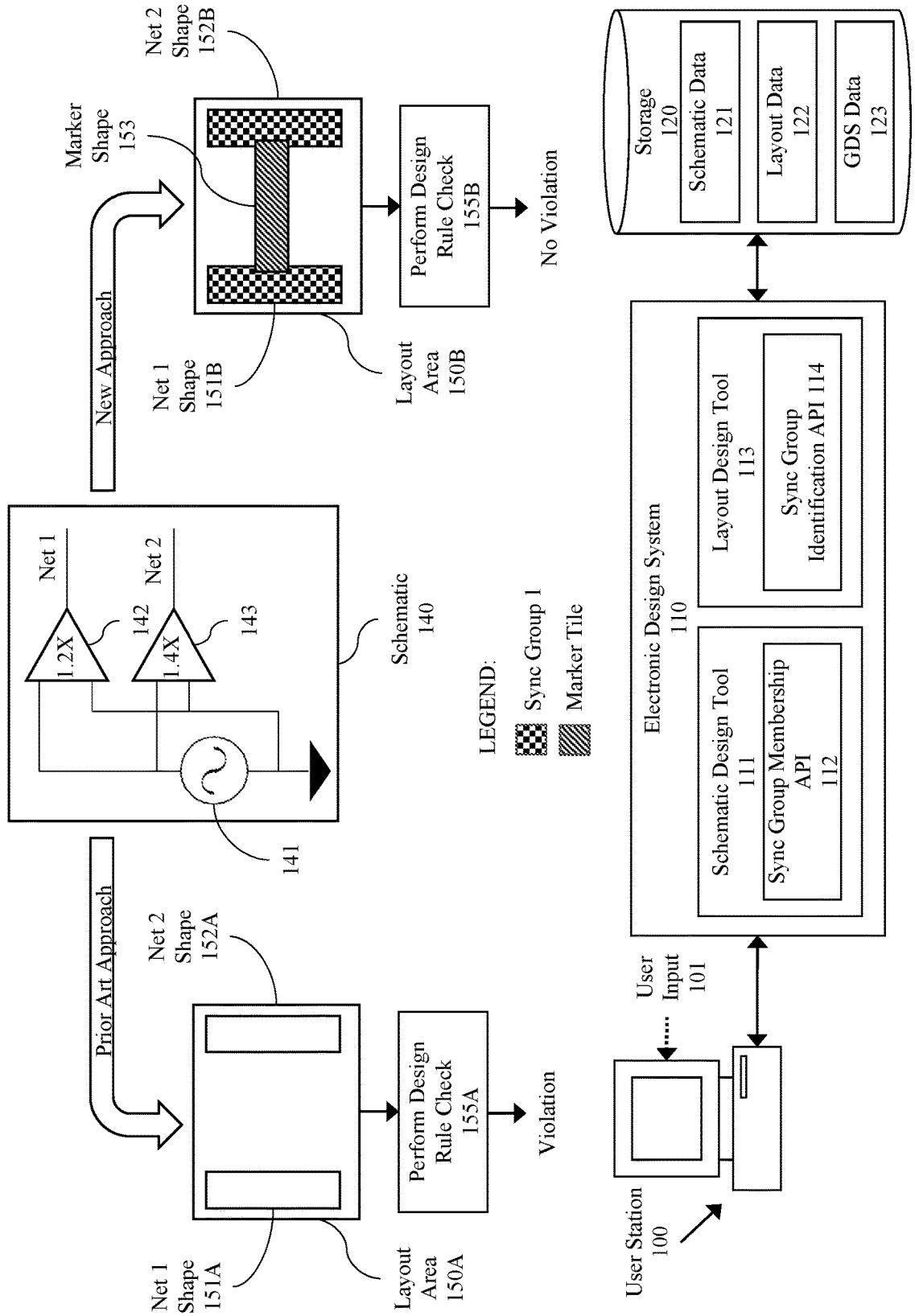
FIG. 1 illustrates an example system for generating and maintaining a physical design for an electronic circuit having sync group constraints for design rule checking according to some embodiments.

FIG. 1 illustrates an example system for generating and maintaining a physical design for an electronic circuit having sync group constraints for design rule checking according to some embodiments. Generally, the process provides for identification of sync groups (nets having synchronous voltage behavior), identifying shapes corresponding to those nets, and performance of design rule verification that accounts for the synchronous behavior—such as in selecting the most appropriate spacing required.

FIG. 1 includes an illustrative schematic 140 to assist in explaining the issue. The schematic 140 includes a signal source 141, logic gates 142 and 143, and nets 1 and 2. This same schematic can be analyzed using the prior art approach or the new approach.

Using the prior art approach, the schematic may be converted into a layout (represented by layout area 150), including net 1 shape 151A corresponding to net 1, and including net 1 shape 152A corresponding to net 2. Such an arrangement, when analyzed during a design rule check process, 155A, as illustrated here, results in a design rule violation—e.g. Shape 151A is too close to shape 152A.

However, in contrast to the prior art approach, the new approach includes a process for identifying and maintaining sync group information. First, note that the logic gates 142 and 143 are connected to the same inputs (respective sides of 141). Thus, the outputs of the logic gates 142 and 143 (at net 1 and net 2) are likely to have some sort of fully or partially synchronous behavior. In particular, as the output at net 1 increases the output at net 2 is likely to also be increasing. Similarly, as the output at net 1 decreases the output on net 2 is likely to also be decreasing. Thus, the maximum voltage difference encountered would be expected to be lower than if the nets were not synchronous. For instance, for nets that are not synchronous, the voltage different between the two nets can be represented by $dV=MAX(V_{max1}, V_{max2})-MIN(V_{min1}, V_{min2})$. However, for synchronous nets, the voltage different is represented by $dV=MAX(|V_{max1}-V_{max2}|, |V_{min1}-V_{min2}|)$. Essentially, for nets that are not synchronous the maximum voltage difference is the largest possible voltage minus the lowest possible voltage. However, for synchronous nets, the maximum difference is essentially the larger of the differences between the peak voltages or the minimum voltages. Unfortunately, spacing requirements between elements are generally dependent on this voltage difference. Where a larger difference requires greater spacing and a smaller difference allows for more closely spaced shapes. The prior art approach does not account for the synchronous nature of circuit elements such as those illustrated by net 1 and net 2 and thus generate violations where ideally no violation would be generated.

The new approach illustrated herein provides for a way to generate and maintain a physical design for an electronic circuit having sync group constraints for design rule checking. Layout area 150B provides for an illustration of some of the aspects herein. In particular, net 1 shape 151B and net 2 shape 152B are illustrated as being in the same sync group. Additionally, a marker shape 153 is utilized to enable the passing of sync group constraints to a physical design (e.g. layout file or GDS file). Specifically, the marker shape includes a parameter that specifies that other shapes touching the marker shape are in the same sync group. In this way, the sync group information can be passed to a design rule checking process. As a result, a design rule check may not result in a violation as illustrated here because a different spacing rule/distance/minimum is applied to the two shapes (151B and 152B) that allows for the shapes to be closure together without triggering an error. Because of this, an end product that is designed using these techniques can have certain shapes (shapes within the same sync group) placed closer together which allows for the inclusion of more transistors and therefor processing power within a given device.

In some embodiments, a user station 100 includes or provides access to an electronic design system 110. For instance, the electronic design system 110 might be located on the user station 100, on a remote device accessed by the user station, or distributed across multiple devices. The user station 100 causes the execution of instructions for generating and maintaining a physical design for an electronic circuit having sync group constraints for design rule checking according to some embodiments as disclosed herein. The user station 100 comprises any type of computing station that is useable to operate or interface with a database 120. Examples of such user stations include workstations, personal computers, or remote computing terminals. In some embodiments, the user station 100 comprises a display device, such as a display monitor, for displaying a user interface to users at the user station. The user station 100 also comprises one or more input devices for the user to provide operational control over the user station, such as a mouse or keyboard to manipulate a pointing object in a graphical user interface from which a user input 101 might be received.

The electronic design system 110, as illustrated, includes a schematic design tool 111 and a layout design tool 113. In some embodiments, the various components, or the functions, of the electronic design system 150 are combined or separated into different components from those illustrated.

The schematic design tool 111 comprises a tool for creating and or modifying a schematic of a circuit design. For instance, schematic design tools are generally known in the art and comprise different components for different types of design activities. For instance, one circuit design component might comprise an interface for accepting a hardware description or portion thereof as described by a hardware design language (e.g. Verilog, VHDL, etc.). Another circuit design component might comprise a circuit design component for manually manipulating/creating a circuit design using a circuit schematic. Generally, the schematic design tool 111 operates on schematic data (e.g. schematic data 121 stored in database 120) and can be used to generate a circuit schematic used in semiconductor/electronics manufacturing. In some embodiments, the schematic design tool 111 and/or the electronic design system 110 is modified to include an interface (sync group application programing interface (API) 112) to identify nets that should be part of a sync group. The operations of the sync group membership API 112 will be discussed further below in regard to FIG. 2 block 202. Briefly, the sync group membership API processes a design schematic to identify nets that are expected to exhibit synchronous voltage behavior.

The layout design tool 113, comprises a tool for creating and or modifying a layout of a circuit design. For instance, layout design tools are generally known in the art and comprise different components for different types of design activities. For instance, a layout design component might comprise a layout editor for modifying/creating layers of a design as they would be constructed on a semiconductor substrate or printed circuit board. Generally, the layout design tool 113 operates on layout data (e.g. layout data 122 stored in database 120) and can be used to generate a circuit layout used in semiconductor/electronics manufacturing. The circuit layout will often be transferred/converted into a graphic database system (GDS) file (e.g. GDS data 123) as part of the final verification processes prior to manufacturing including a final design rule check of a circuit design. In some embodiments, the layout design tool 113 and/or the electronic design system 110 is modified to include an interface (sync group identification API 114) to control the transfer and management of sync group constraints within a physical design (e.g. within layout or GDS data). The operation of the sync group identification API 114 will be described further below. Briefly, the sync group identification API generates marker shapes to associated shapes within a physical design with the corresponding sync group constraints.

The system includes a database 120 which is illustrated as including schematic data 121, the layout data 122, and the GDS data 123. In some embodiments, the database 120 comprises a single database with one or more subsets within the database for the different types of data as illustrated in FIG. 1. However, in some embodiments the database comprises multiple separate databases on different computing systems and/or in different locations connected via electronic communication links (e.g. wired and/or wireless networks). The system may further include a database access module(s) for accessing and storing the data, whether stored at a single database or at multiple databases.

The schematic data 121 comprises any types of representations of a schematic of a circuit design. For instance, the design data comprises any one or more of a hardware descriptive language design, a circuit schematic design, or any combination thereof. The layout data 122 comprises any types of representations of a physical form of a circuit design. For instance, the design data comprises a circuit layout consisting of a plurality of shapes on a plurality of layers. The GDS data 123 is an industry standard representation of a physical form of a circuit design. However, here the schematic data 121, the layout data 122, and the GDS data 123 comprise additionally data for identifying sync groups as will be discussed further below.

Figure 2:
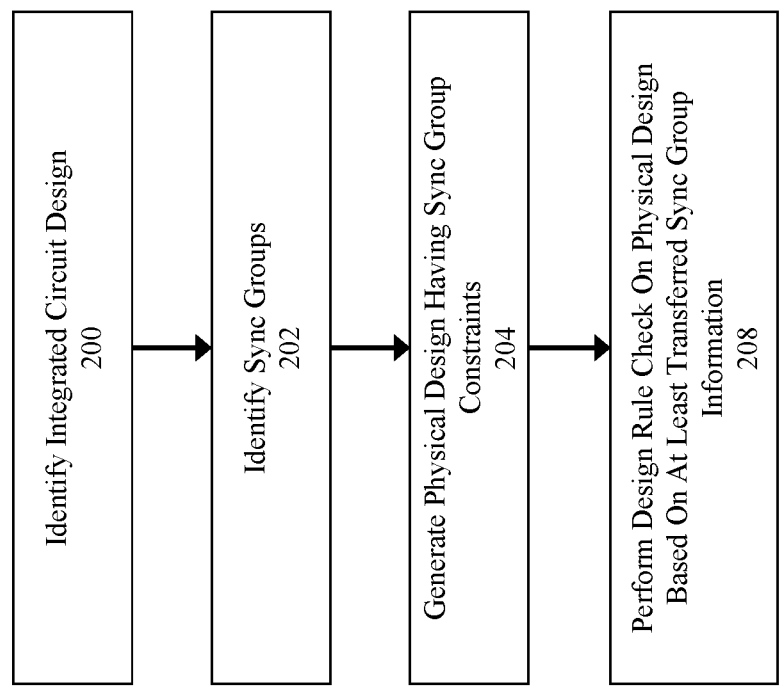
FIG. 2 illustrates a flow for generating and maintaining a physical design for an electronic circuit having sync group constraints for design rule checking according to some embodiments.

FIG. 2 illustrates a flow for generating and maintaining a physical design for an electronic circuit having sync group constraints for design rule checking according to some embodiments. Generally, the process includes identifying an integrated circuit design, identification of sync groups, the generation of a physical design that includes sync group constraints, and a design rule checking process to identify violations of one or more design rules.

In some embodiments, at 200, an integrated circuit design is identified. The integrated circuit design might be identified based on a user input (e.g. a user selects a specific file(s)), based on a currently open design (e.g. when the user selects a sync group identification action), or based on some other inputs (e.g. a design generated on the fly by an integrated circuit construction tool based on one or more user selections/specifications).

At 202, sync groups are identified from a target design. For instance, a design can be traversed to identify circuit elements that should be part of a sync group, such as when the circuit elements have the same or similar inputs or where the nets have a known or determinable timing relationship and/or voltage relationship. For example, sync groups can be defined based on identification of their voltages having dependence on the same or related inputs, either in whole or in part.

At 204, a physical design is generated having sync group constraints. The generation of the physical design will be discussed further below. Briefly, sync group information is passed from the schematic level to the layout design tool (e.g. 113) where shapes corresponding to nets in sync groups are identified as being part of a sync group—e.g. by a marker shape on a particular layer purpose pair. For example, marker shapes are created that, in aggregate, touch all members of the same sync group. Because these marker shapes touch the members of a sync group, they can be used to impart voltage sync information to the shapes and thus allow for selection of design rules that allow for tighter/closer spacing. The marker shapes may be created on a special layer purpose pair that corresponds to the layers that they touch. To illustrate, a marker shape may be represented by two aspects. A voltageLayerMarkerMapping(layerConstraint) and a voltageLayerPairMarkerMapping(layerPairConstraint)—e.g. (voltageLayerMarkerMapping "metal" 'layer "metal1" 'purpose "vsync") and (voltageLayerPairMarkerMapping "metal" "metal1" 'layer "metal1" 'purpose "vsync"), where the 'layer is the layer on which the marker shape will be output and the 'purpose is the purpose for which the marker shape will be output.

At 208, a design rule check is performed on the physical design based on at least the transferred sync group information. As discussed above, this comprises performing a design rule check where spacing rules may be selected based on at least the sync group information for at least some shapes that are members of a sync group.

Figure 3:
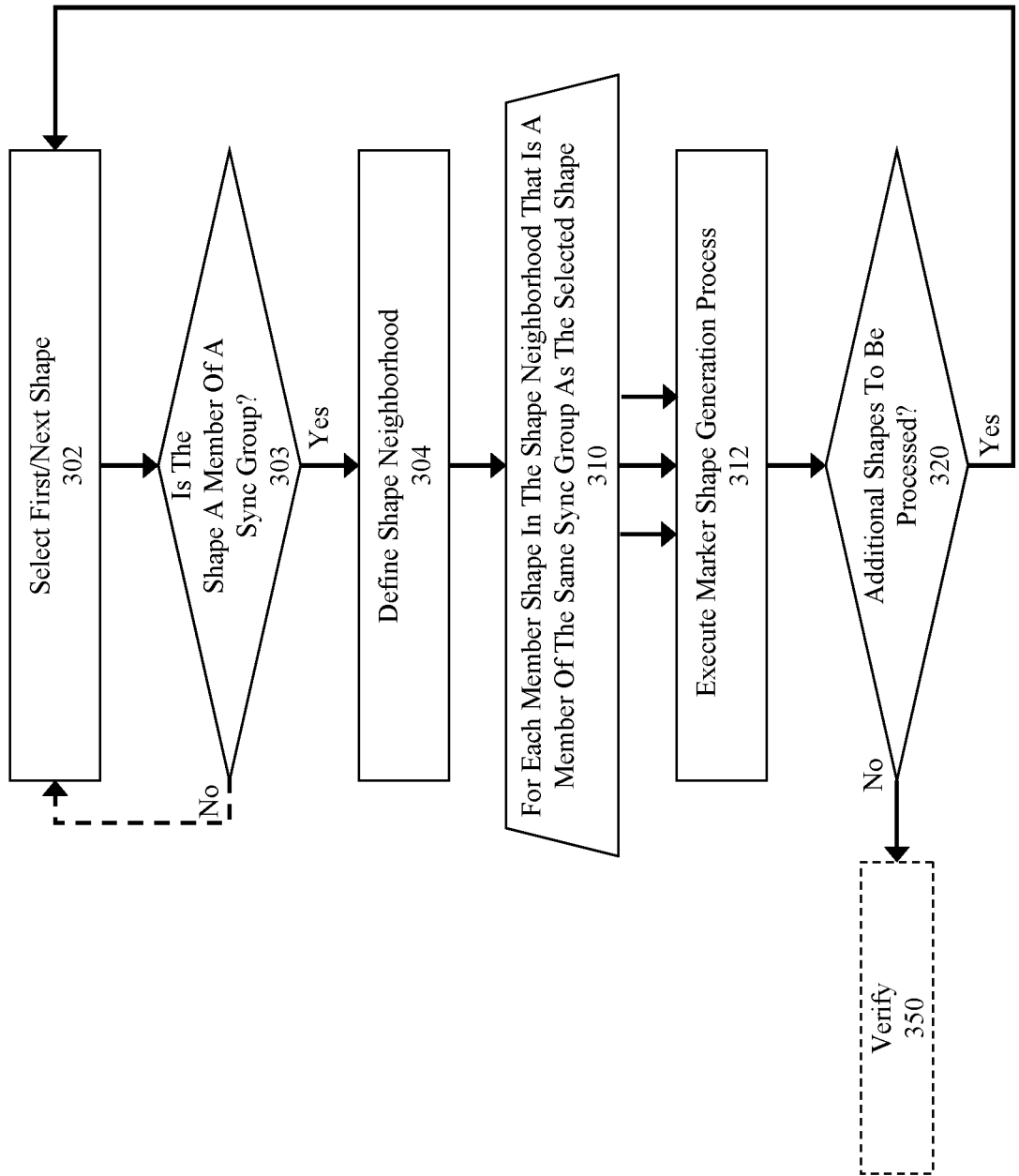
FIG. 3 illustrates a more detailed flow for the generation of a physical design having sync group constraints as in 204 of FIG. 2 according to some embodiments.

FIG. 3 illustrates a more detailed flow for the generation of a physical design having sync group constraints as in 204 of FIG. 2 according to some embodiments. Generally, the process operates on the basis of different shapes, where shapes that are members of a sync group are selected and processed using a marker shape generation process.

The process starts at 302 where a first/next shape is selected. For instance, shapes may be selected based on position, identifier, location in a table or other data structure, or on any other basis or combination thereof. The selected shape is evaluated at 303 to determine if the shape is a member of a sync group. If the shape is not a member of a sync group, management data may be updated (e.g. an entry added to a hashing table to indicated that the shape has already been processed) and a different/next shape is selected at 302. However, if at 303 it is determined that the shape is a member of a sync group, the process continues at 304.

At 304, a shape neighborhood is defined. In some embodiments, a region surrounding the shape is defined in which to perform further processing. For example, a neighborhood might be defined by the maximum required spacing for the layer on which the shape is located, such that the neighborhood surrounds the shape with a minimum amount from each edge of the selected shape.

At 310, for each shape in the shape neighborhood that is a member of the same sync group as the selected shape, a process is instantiated to execute the marker shape generation process 312 as will be discussed further below. Additionally, because each shape is independent and the shapes themselves are not modified by this process, the instantiation of the marker shape generation process may be executed in parallel for multiple/different shapes—e.g. the process does not need to wait for one member shape to be processed before selecting another shape to be processed and instantiating a marker shape generation process for a next selected shape. Regardless, the process continues at 320 where a determination is made as to whether there are additional shapes for be processed.

If there are no more shapes to be processed, the marker shapes may optionally be verified at 350. As will be discussed further below, the verification process may include verification that marker shapes actually connect members of a sync group, that marker shapes provide a connection path between all members of a sync group, and that marker shapes do not connect one sync group to a different sync group. This can be particularly important where a physical design has been changed from a version that existed which already included marker shapes. Additionally, the verification process can determine whether the marker shape generation process has completed without errors.

Figure 4:
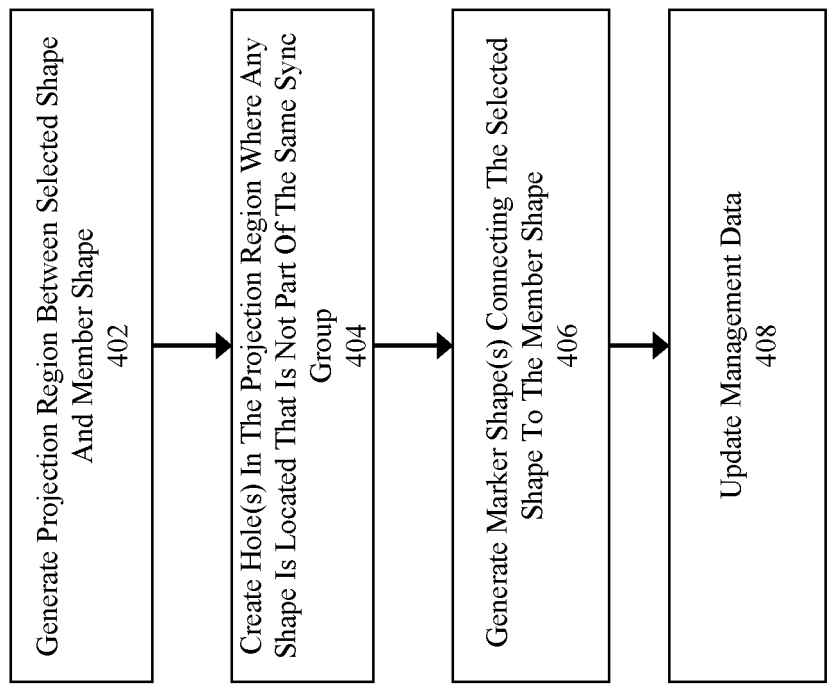
FIG. 4 illustrates a more detailed flow for the execution of a marker shape generation process as in 312 of FIG. 3 according to some embodiments.

FIG. 4 illustrates a more detailed flow for the execution of a marker shape generation process as in 312 of FIG. 3 according to some embodiments. Generally, the process includes defining a region between the selected shape and the member shape, exclusion of any areas from the region that include shapes that are not part of the same sync group, generation of a marker shape that connects the selected shape and the member shape, and updating management data.

At 402, a projection region between the selected shape and the member shape is generated. For example, in a two-dimensional design layer, a marker shape is generated that extends from the lowest horizontal axis position and to the highest horizontal axis position shared by the two shapes. Additionally, the shape extends from the lowest vertical axis position and to the highest vertical axis position. Essentially, the projection region comprises a square or rectangle between the two shapes.

At 404, holes in the projection region are generated. In particular, wherever a shape is located that is not part of the same sync group, a hole is created. For example, if a shape is found in the region that corresponds to a different sync group or even no sync group at all, a hole is created that excludes/removes the area of the shape from the region.

At 406, a marker shape is generated that connects the selected shape to the member shape. For example, a maximal tile may be created that connects the two shapes, a tile may be created that connects the most members of the sync group (e.g. where one or more additional shapes in the same sync group are found in the projection region), or some combination thereof. Specifically, a shape is created (rectangle or square) that connects the two shapes, where the marker shape has the corresponding layer purpose pair and identifying information as previously discussed. In some embodiments, a marker shape (tile) may not be possible to create without errors—e.g. overlap with a shape that is not a member of the same sync group as the selected shape. In such an event, a verification process may later identify these errors subsequently to determine whether they require further processing, where the shape may not require further processing because another shape connected to the selected shape is already connected to the member shape via a marker tile.

At 408, management data is updated to indicate the current state of processing. For example, a hash of the shape identifier may be used to indicate that the marker shape has been processed or processed with errors.

Figure 5:
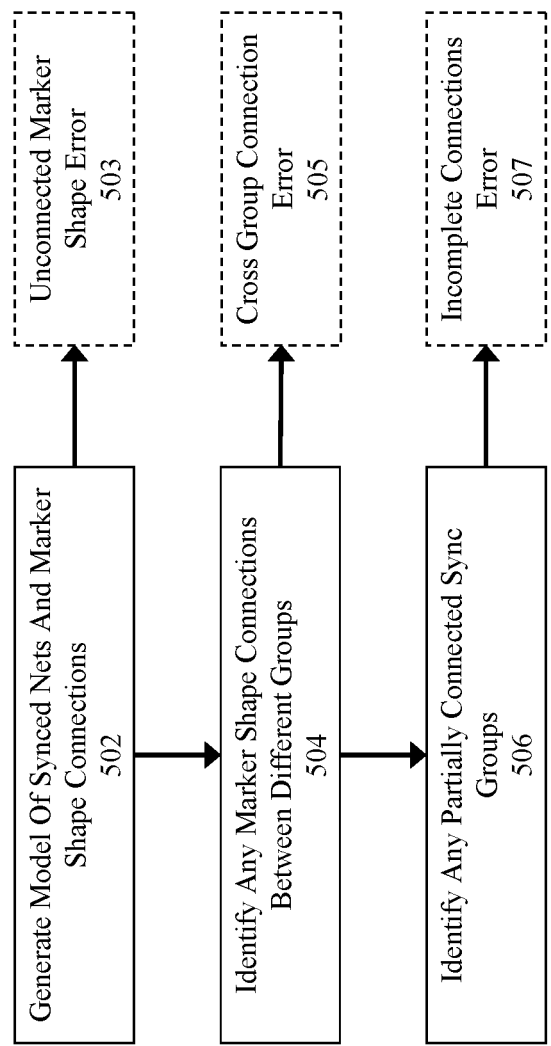
FIG. 5 illustrates a more detailed flow for the verify process as in 350 of FIG. 3 according to some embodiments.

FIG. 5 illustrates a more detailed flow for the verify process as in 350 of FIG. 3 according to some embodiments. Generally, the verification process includes generation of a model of the synced nets and marker shape connections and processing the model to identify marker shapes errors.

At 502, a model of synced nets and marker shape connections is generated. Note that whereas the marker shape generation process operates on shapes to connect shapes in the same sync group (e.g. shapes for nets in the same sync group), the verification process operates at the level of nets and net connections. As will be illustrated below, one possible approach comprises generation of a graph of nodes and edges, where nets are represented by nodes and connections are represented by edges. Additionally, in the event that a marker shape is identified as not connecting to two or more sync group nets, an error is generated at 503 to log an unconnected marker shape. Normally, a marker shape that does not connect to two or more sync group nets will be removed—e.g. to avoid adding artifacts that are no longer relevant to a design.

At 504, the model is analyzed to identify any marker shape connections between different groups. For example, if a marker shape connects to a net in sync group 1 and to a net in sync group 2, the process will issue a cross group connect error at 505. In some embodiments, the marker shape that connects across sync groups will be automatically removed.

At 506, the model is analyzed to identify any partially connected sync groups. For example, each sync group is analyzed using the model to determine whether a path exists between all nodes in the group via one or more nodes or edges. Where a node cannot be reached from another node via one or more edges and nodes an incomplete connection error is issued at 507.

In some embodiments, a user may be presented with one or more errors or warning for marker shape errors such as the unconnected marker shape error at 503, the cross-group connection error at 505, or the incomplete connections error at 507. In some embodiments, errors are collected into a log and one or more errors are subsequently processed to determine whether an automated solution can be generated such as a more complicated auto routing process to connect sync group members via a marker shape(s) that does not overlap with non-group member shapes.

FIGS. 6A-6F provide an illustrative example of the more detailed flow for the execution of a marker shape generation process in FIG. 4 according to some embodiments.

Figure 6A:
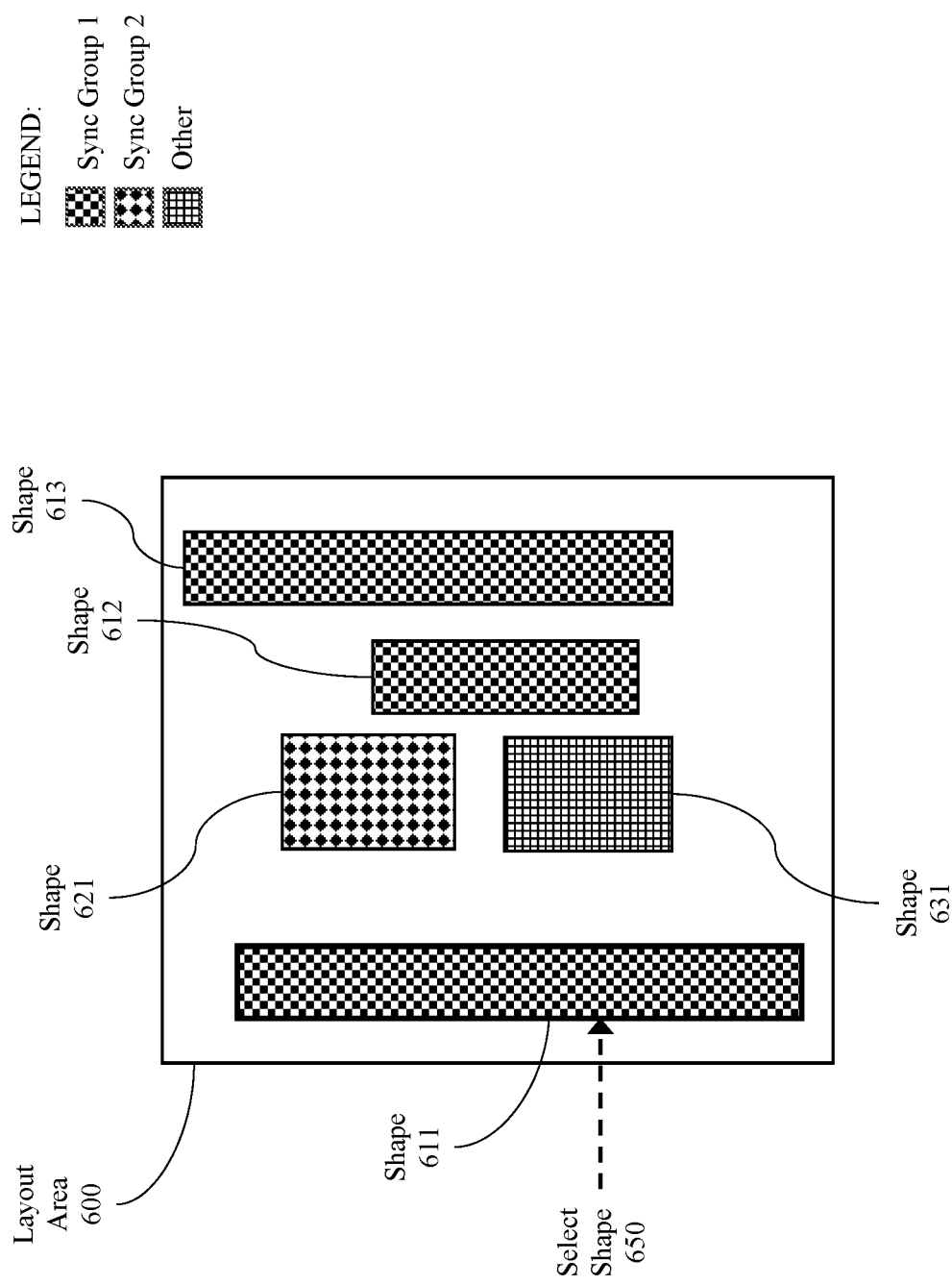

FIG. 6A illustrates a layout area 600 having five shapes. However, layout area 600 might be only a small subset of a design that include millions or billions of shapes. Shapes 611, 612, and 613 are all part of the same sync group. Shape 621 is part of a different sync group, and shape 631 is not part of any sync group. Additionally, shape 611 is selected at 650, such as discussed above in regard to FIGS. 3 and 302.

Figure 6B:
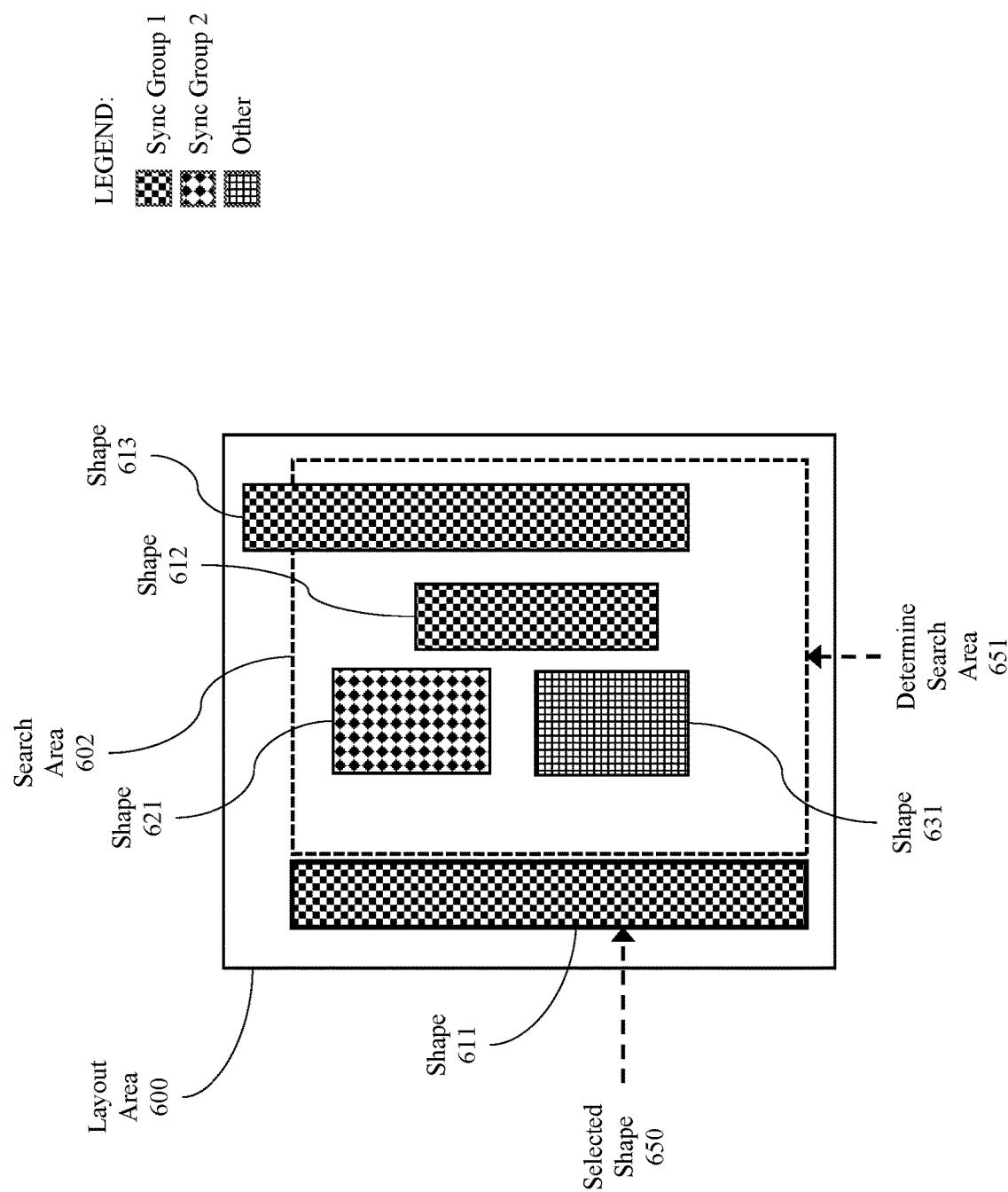

FIG. 6B illustrates the addition of search area 602. The search could be determined at 651 in any way discussed above in regard to FIG. 3 at 304. In some embodiments, the search area is limited to certain directions such as where the layout area is at a boundary or in the presence of a keep out zone.

Figure 6C:
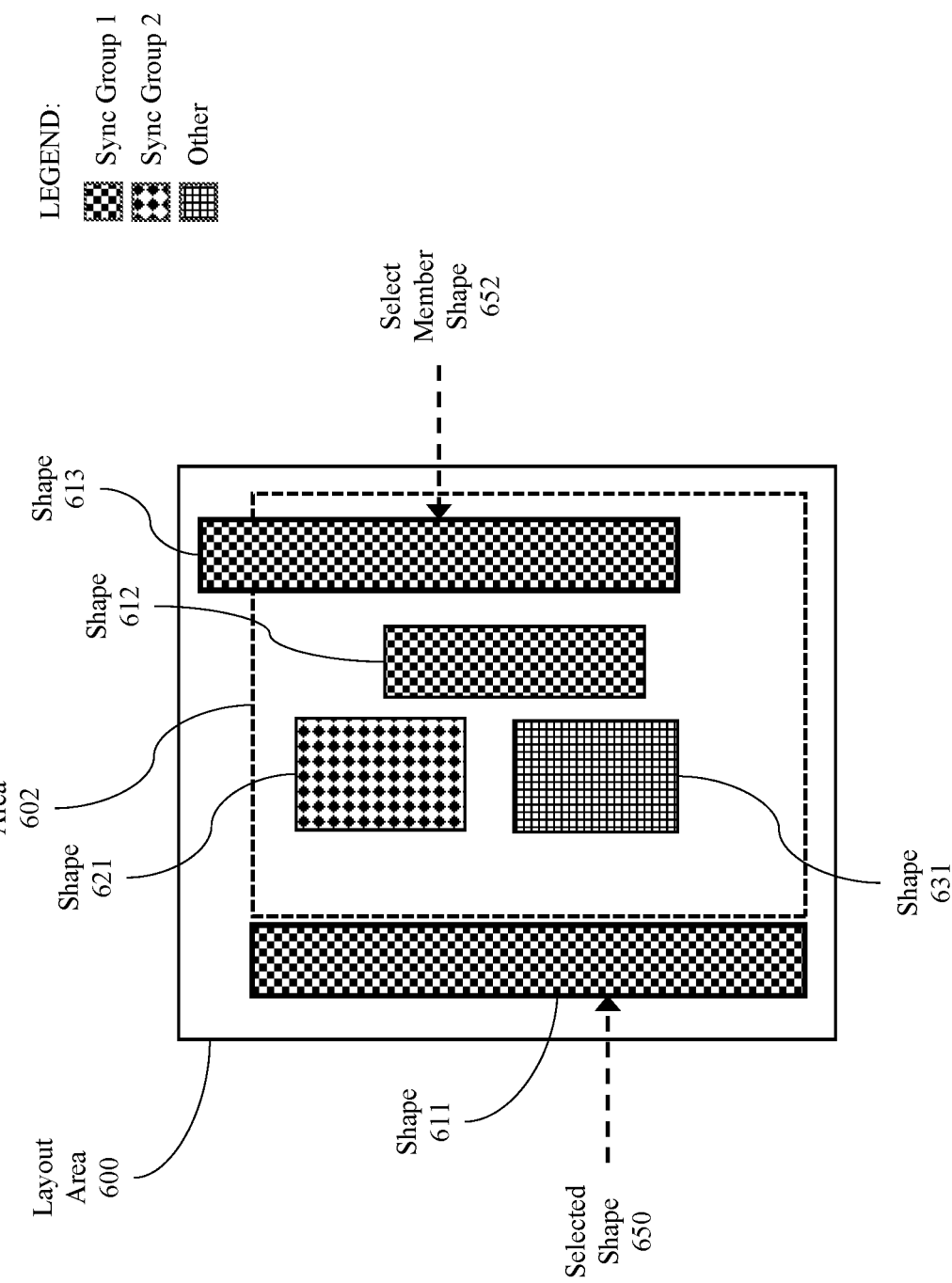

FIG. 6C illustrates the selection of a member shape at 652. Specifically, the shape 613 is selected as the member shape. This could be performed in any way as discussed above in regard to FIGS. 3 and 310. For example, the shape could be selected based on a shape identifier or a position in a list, table, or other data structure.

FIG. 6D illustrates the creation of a projection area 604. Here, the generation at 653 of the projection area represents the space that a square/rectangle occupies between the two shapes where the shape does not extend beyond either of the selected shape 650 or the selected member shape 652. Furthermore, the projection area could be generated in any of the ways discussed above in regard to FIGS. 4 and 402.

Figure 6E:
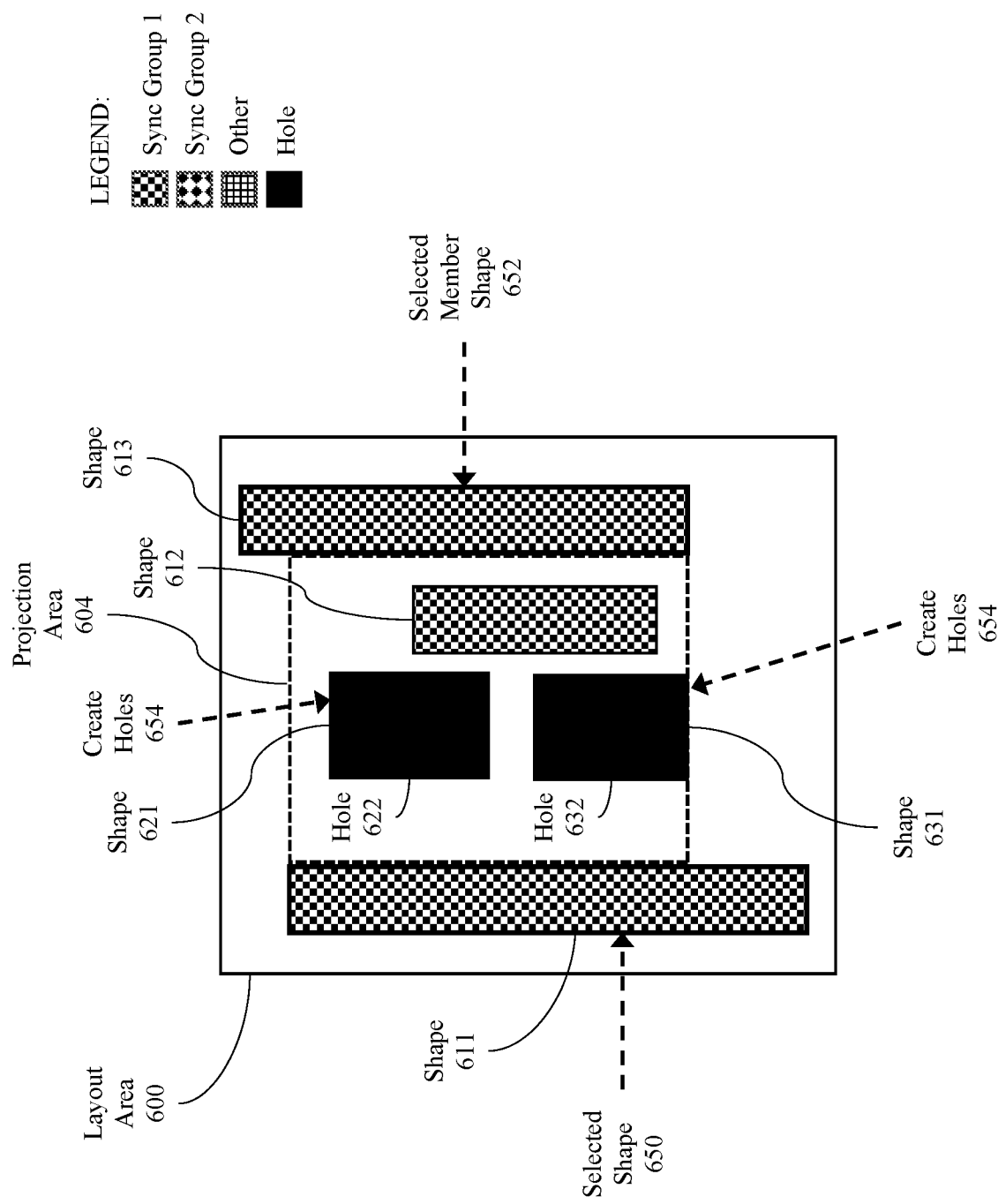

FIG. 6E illustrates the punching/creation of holes at 654. Specifically, the figure illustrates the creation of holes that cover/encompass any shapes that are not in the same sync group as the selected shape 650. Here that corresponds to shapes 621 and 631, and holes 631 and 632 respectively.

Figure 6F:
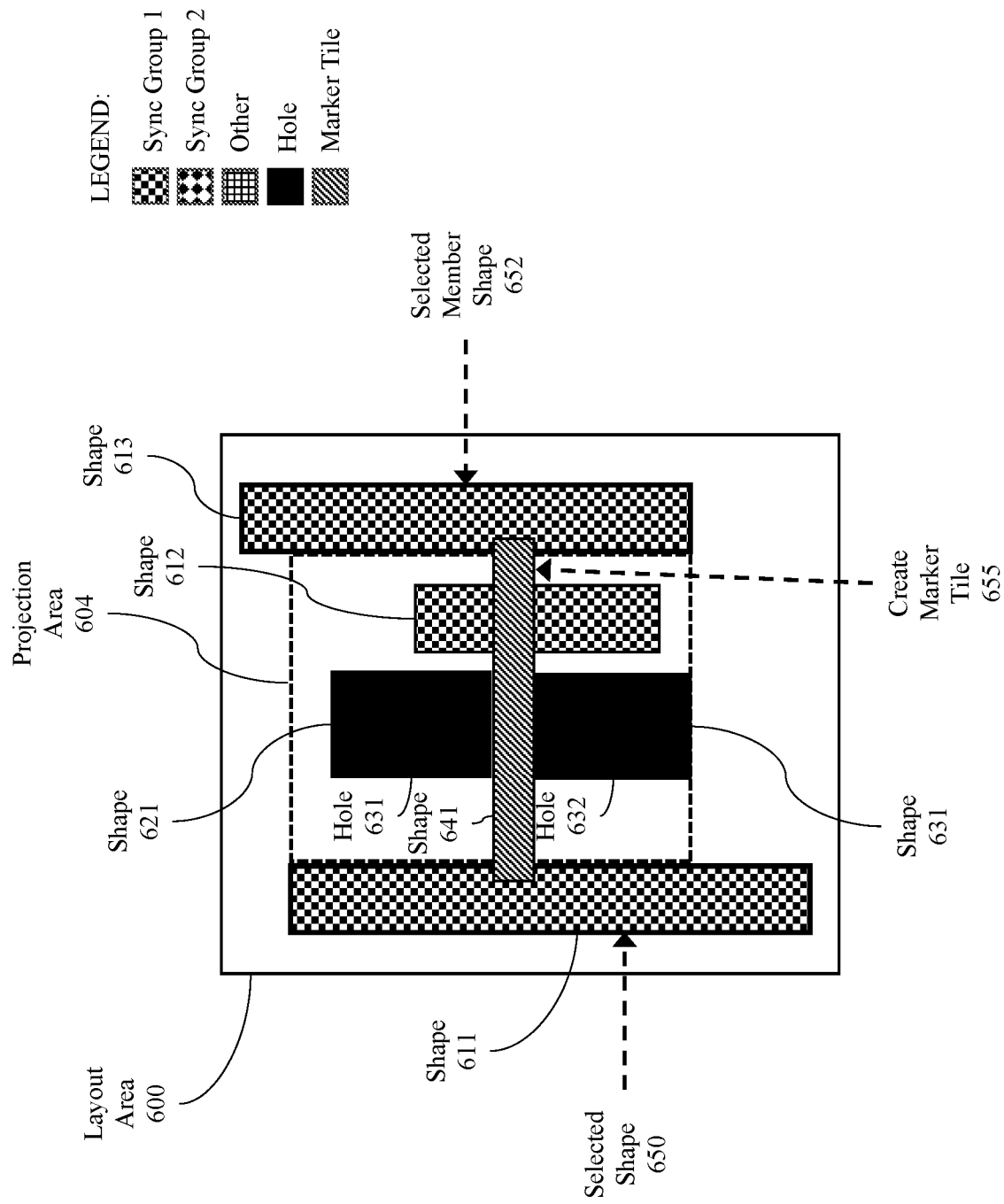

FIG. 6F illustrates the creation of marker shape (marker tile) 641. For example, the marker shape is created at 655. As illustrated, the marker shape intersections with the selected shape 650, the selected member shape 652, and the shape 612. However, as can be seen from the illustration the marker tile could have been created above hole 631. In some embodiments, all possible marker tiles may be evaluated where a marker shape that connects to the most members of the corresponding sync group is selected for creation. Alternatively, if all marker shapes connect to the same number of shapes in the same sync group a marker tile may be selected based on the size (e.g. a maximal tile) or at random.

Figure 7:
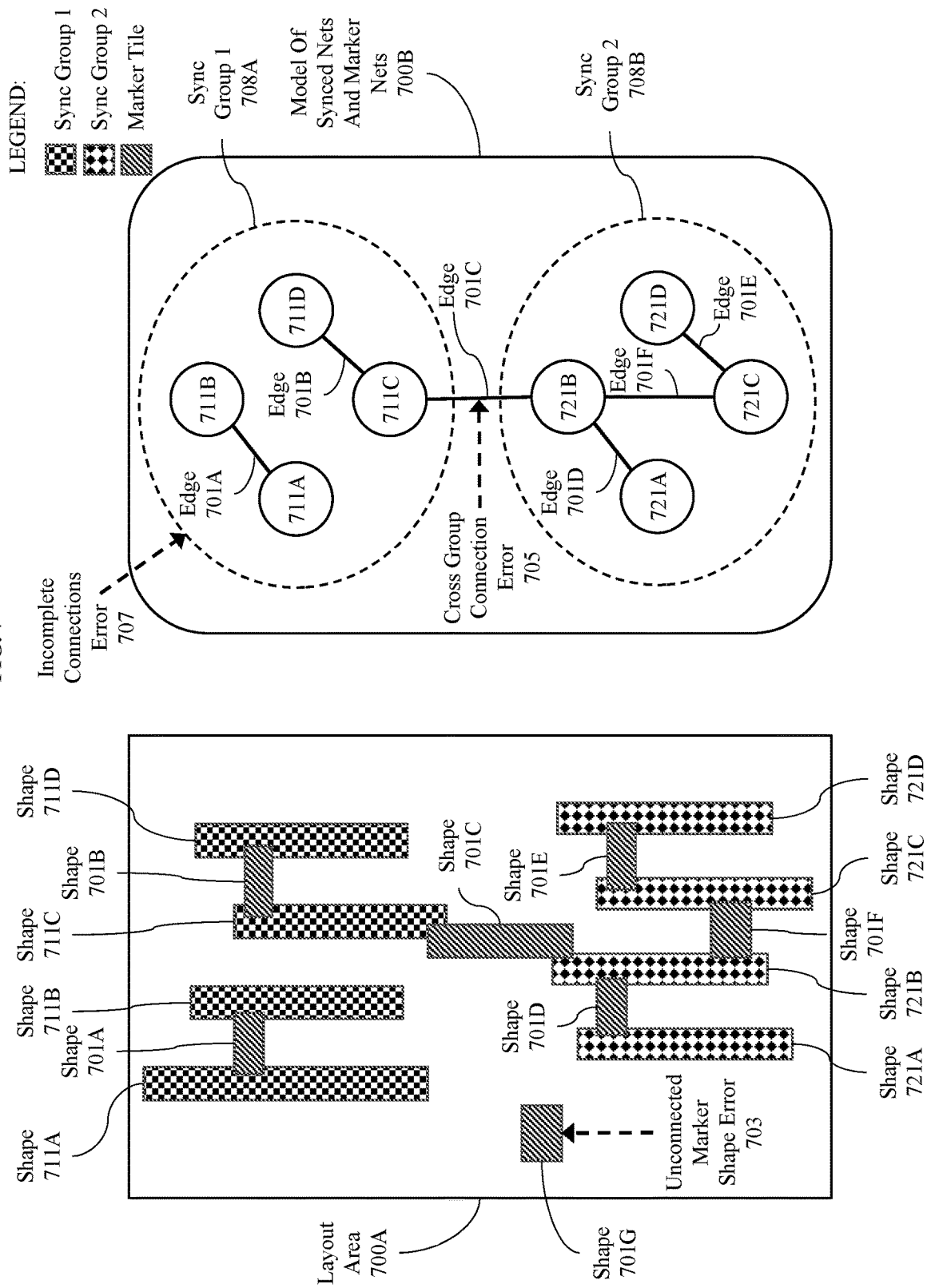
FIG. 7 provides an illustrative example of the more detailed flow for the verify process in FIG. 5 according to some embodiments.

FIG. 7 provides an illustrative example of the more detailed flow for the verify process 350 in FIG. 5 according to some embodiments.

The illustration includes a layout area 700A having shapes 711A-D corresponding to a first sync group, 721A-D corresponding to a second sync group, and a number of marker shapes 701A-G. As illustrated, marker shape 701A connects shape 711A to shape 711B, marker shape 701B connects shape 711C to shape 711D, marker shape 701C connects shape 711C to shape 721B, marker shape 701D connects shape 721A to shape 721B, marker shape 701E connects shape 721C to shape 721D, marker shape 701F connects shape 721B to shape 721C, and marker shape 701G does not connect with any shapes. As discussed above, a marker shape that is not connected to anything will result in the generation of an unconnected marker shape error at 703 pursuant to 503 in FIG. 5.

The layout area 700A can also be represented as a model of synced nets and marker nets at 700B. For instance, each shape can be represented as a node and each connection created by a marker shape can be represented as an edge between two corresponding nodes. Here for ease of illustration, the shape numbers and the node numbers for corresponding elements are the same. This is similar to one possible method of model generation where a shape identifier is used and a node identifier. Likewise, the marker shapes are represented as edges having corresponding connections of the marker shapes illustrated in the layout area 700A.

The model of synced nets and marker nets 700B represent both sync groups from the layout area. Specifically, sync group 1 is represented by the elements defined inside 708A and sync group 2 is represented by the elements defined inside 708B. Thus, an edge that crosses 708A or 708B are likely to be a cross group connection error because they connect one group to another (see e.g. cross group connection error 705) which can be identified as discussed above in regard to 505 in FIG. 5. Additionally, a node that is within a sync group that does not have a path to each and every other node within the same sync group, either directly or indirectly, should cause the generation of an incomplete connections error (see e.g. incomplete connections error 707). Here, there is no connection in the model 700B between 711A or 711B to either 711C or 711D, either directly or indirectly. Thus, an incomplete connections error will be generated at 707.

In some embodiments, analysis of the model may be used as a trigger to reanalyze the physical design or to utilize more advanced routing techniques for the marker shapes, such as by using an auto routing process.

Therefore, what has been described herein an improvement to EDA tools used to design semiconductor devices that improves performance by allowing for an increased amount of processing elements/circuits to be created within a semiconductor. Specifically, the approach provides for use of different spacing rules for shapes in an integrated circuit design when those shapes are part of the same sync group by generating and maintaining a physical design for an electronic circuit that accounts for synchronous voltage behavior.

System Architecture Overview

Figure 8:
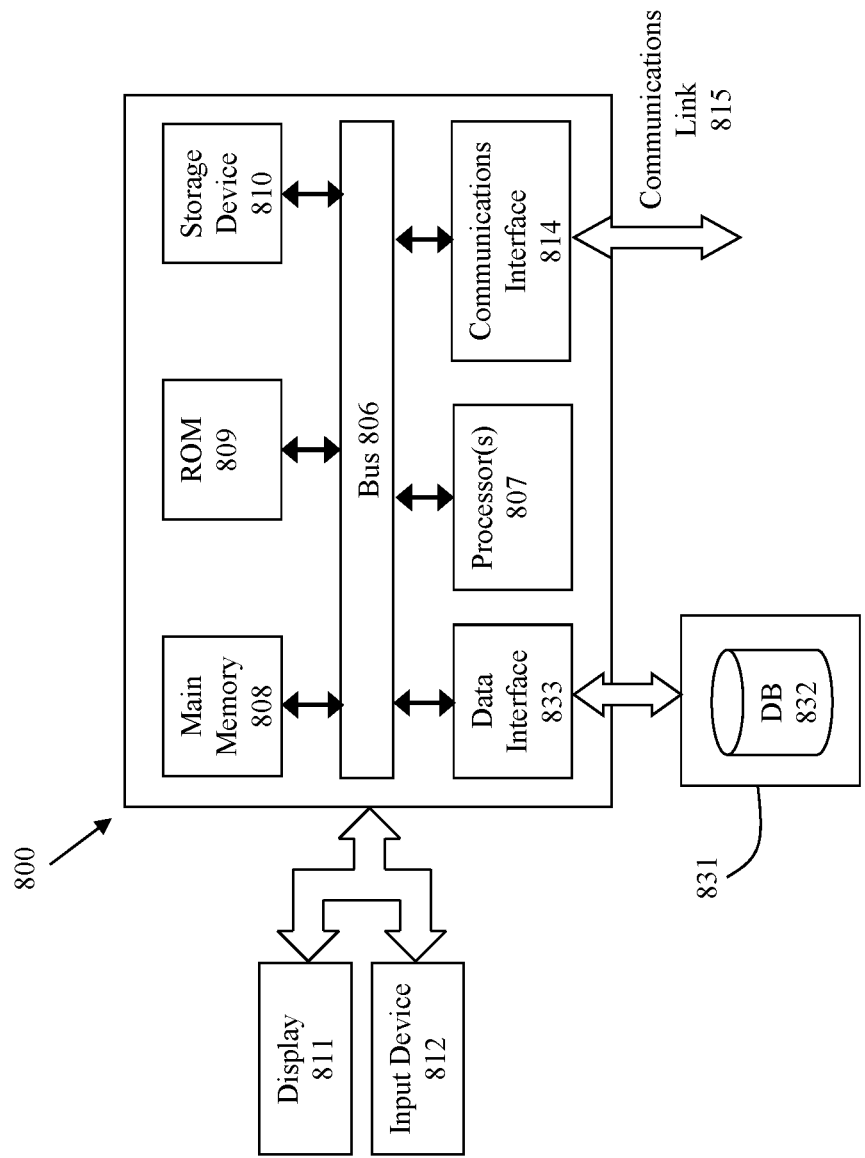
FIG. 8 shows an architecture of an example computing system with which the invention may be implemented.

FIG. 8 shows an architecture of an example computing system with which the invention may be implemented. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control.

According to one embodiment of the invention, computer system 800 performs specific operations by processor 807 executing one or more sequences of one or more instructions contained in system memory 808. Such instructions may be read into system memory 808 from another computer readable/usable medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. Computer system 800 may communicate through a data interface 833 to a database 832 on an external storage device 831.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   identifying an integrated circuit design embodied in schematic data;
   identifying, by analyzing the schematic data, a plurality of sets of nets in respective sync groups;

generating a physical design having sync group constraints for the respective sync groups, wherein sync group constraints are maintained in the physical design using marker shapes; and processing the physical design having sync group constraints to identify a constraint error, wherein the constraint error comprises an unconnected marker shape error, a cross group connection error, or an incomplete connections error.

2. The method of claim 1, further comprising performing a design rule check on the physical design based on at least the sync group constraints.

3. The method of claim 1, wherein the sync group constraints comprise shape membership in a sync group.

4. The method of claim 3, wherein shape membership is associated with a net of a corresponding shape.

5. The method of claim 1, wherein the unconnected marker shape error is generated in response to identification of a marker shape that is not connected to any shape corresponding to a net in the schematic data, the cross group connection error is generated in response to identification of a marker shape that is connected to two shapes corresponding to two nets in the schematic data that are not in the same sync group, or the incomplete connection error is generated in response to identification of shapes in an individual sync group that are not fully connected by marker shapes.

6. The method of claim 1, wherein marker shapes have a purpose that corresponds to a synchronous voltage behavior.

7. The method of claim 1, wherein marker shapes maintain the sync group constraints by contacting corresponding shapes in a corresponding sync group.

8. A non-transitory computer readable medium having stored thereon a sequence of instructions which, when executed by a processor performs a set of acts, the set of acts comprising:

identifying an integrated circuit design embodied in schematic data;

identifying, by analyzing the schematic data, a plurality of sets of nets in respective sync groups;

generating a physical design having sync group constraints for the respective sync groups, wherein sync group constraints are maintained in the physical design using marker shapes; and processing the physical design having sync group constraints to identify a constraint error, wherein the constraint error comprises an unconnected marker shape error, a cross group connection error, or an incomplete connections error.

9. The computer readable medium of claim 8, further comprising performing a design rule check on the physical design based on at least the sync group constraints.

10. The computer readable medium of claim 8, wherein the sync group constraints comprise shape membership in a sync group.

11. The computer readable medium of claim 10, wherein shape membership is associated with a net of a corresponding shape.

12. The computer readable medium of claim 8, wherein the unconnected marker shape error is generated in response to identification of a marker shape that is not connected to any shape corresponding to a net in the schematic data, the cross group connection error is generated in response to identification of a marker shape that is connected to two shapes corresponding to two nets in the schematic data that are not in the same sync group, or the incomplete connection error is generated in response to identification of shapes in an individual sync group that are not fully connected by marker shapes.

13. The computer readable medium of claim 8, wherein marker shapes have a purpose that corresponds to a synchronous voltage behavior.

14. The computer readable medium of claim 8, wherein marker shapes maintain the sync group constraints by contacting corresponding shapes in a corresponding sync group.

15. A system, comprising:

memory comprising a sequence of instructions; and a processor that executes the sequence of instructions to perform a set of acts comprising:

identifying an integrated circuit design embodied in schematic data;

identifying, by analyzing the schematic data, a plurality of sets of nets in respective sync groups;

generating a physical design having sync group constraints for the respective sync groups, wherein sync group constraints are maintained in the physical design using marker shapes; and processing the physical design having sync group constraints to identify a constraint error, wherein the constraint error comprises an unconnected marker shape error, a cross group connection error, or an incomplete connections error.

16. The system of claim 15, further comprising performing a design rule check on the physical design based on at least the sync group constraints.

17. The system of claim 15, wherein the sync group constraints comprise shape membership in a sync group.

18. The system of claim 17, wherein shape membership is associated with a net of a corresponding shape.

19. The system of claim 15, wherein the unconnected marker shape error is generated in response to identification of a marker shape that is not connected to any shape corresponding to a net in the schematic data, the cross group connection error is generated in response to identification of a marker shape that is connected to two shapes corresponding to two nets in the schematic data that are not in the same sync group, or the incomplete connection error is generated in response to identification of shapes in an individual sync group that are not fully connected by marker shapes.

20. The system of claim 15, wherein marker shapes have a purpose that corresponds to a synchronous voltage behavior.

* * * * *